April 16, 1935.  A. BERIA  1,997,961

MECHANISM FOR THE TRANSMISSION OF ROTARY MOTION

Filed Jan. 30, 1933  2 Sheets-Sheet 1

INVENTOR
ANTONIO BERIA
BY
Kidd, Margeson & Hornidge
ATTORNEYS

April 16, 1935.   A. BERIA   1,997,961
MECHANISM FOR THE TRANSMISSION OF ROTARY MOTION
Filed Jan. 30, 1933   2 Sheets-Sheet 2

INVENTOR
ANTONIO BERIA
BY
Kiddle, Margeson and Hornidge
ATTORNEYS

Patented Apr. 16, 1935

1,997,961

UNITED STATES PATENT OFFICE 1,997,961

MECHANISM FOR THE TRANSMISSION OF ROTARY MOTION

Antonio Beria, Turin, Italy

Application January 30, 1933, Serial No. 654,270
In Italy December 7, 1932

4 Claims. (Cl. 74—282)

My invention relates to mechanisms for the transmission of rotary motion in which the transmission ratio is variable, and has for its object a mechanism in which the transmission ratio, variable in a continuous manner within certain practically chosen limits, is self-regulating according to the variation of the resistance couple applied to the driven shaft of the mechanism, in such manner as to maintain constant the power transmitted. Thus, if the mechanism transmit power from a practically constant speed motor with a practically constant power output, it will turn the driven shaft at a speed depending on the resistance couple applied to it, and precisely at as much higher speed as the couple is less, and vice-versa, in such manner that the power absorbed by the driven shaft remains practically constant.

Therefore, the mechanism according to this invention finds, in the first place, an important, practical application, what has been already said being taken into consideration, in the change-speed gear of motor cars. It is, however, applicable to other different cases, in general to the drive of operating machines of any type.

The nature, characteristic features, and scope of the invention will be fully understood from the following specification, taken in connection with the accompanying drawings, in which.

Figure 1:
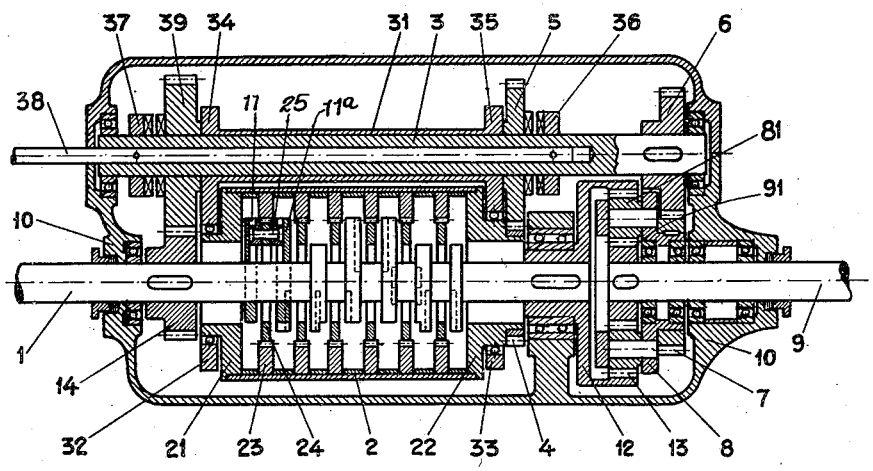
Fig. 1 is a section through the longitudinal vertical axis of the mechanism.
Figure 3:
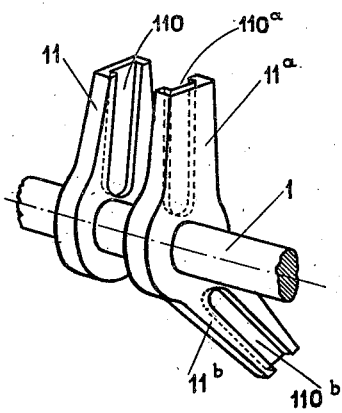
Fig. 3 is a partial view, in perspective, of the driving shaft, with certain parts keyed on it.

Referring to Fig. 1, the driving shaft 1, suitably mounted in bearings formed by the frame 10, which is substantially of box form and encloses the whole mechanism, has keyed to it the parts 11, 11a consisting of a boss and one or two arms (see also Fig. 3) integral with it; in the construction represented in the figures, these members are seven in number. The driving shaft is further provided with a toothed wheel 14, keyed on to it and, towards the end opposite to that which takes the drive, with a bell-shaped part 12 having internal teeth 13.

The arms 11, 11a, 11b of the above mentioned members are each provided with a rectangular groove, as 110, 110a, and 110b the axis of which is at right angles to the axis of the driving shaft 1; the first member 11 (beginning, for example, from the left) has only one arm, whilst the intermediate ones have two, arranged with their axes at a certain angle to each other, which in the case shown (see Figs. 2 and 3) is of 120°, and the last has, like the first only one arm. These members are keyed to the driving shaft at such angles that, for example, one arm of the second member (11a in Fig. 3) is set with its central axis in the same plane passing through the axis of the shaft 1 as the central axis of the first arm (11, Fig. 3) and more precisely the central axis of their respective grooves are in the same axial plane of 1; the other arm of the second member is arranged with its central axis in the same axial plane of 1 as is the first arm of the third member, and the second arm of this is in the same axial plane as the first arm of the fourth member 11; and so on up to the last member. There is thus arranged around the shaft 1 a certain number of pairs (six, in the case illustrated) of arms placed two and two in the same axial plane, and in which the previously mentioned grooves 110 have their respective cavities facing each other as is, for instance, shown in Fig. 3 for the first pair of arms. In each pair of grooves, which form together a prismatic guide, or runway, is fitted so as to slide a member which will be described later. The axial planes of the said pairs of arms divide amongst them the entire circumference into equal angles, for instance, in the case illustrated, into six angles of 60°.

Parallel to shaft 1 and suitably supported in the frame 10 is a secondary shaft 3, on which are loosely mounted the toothed wheels 39 and 5, which can, however, at will, be locked solid with the shaft by means of two dog clutches, shown schematically at 37 and 36 respectively and which are actuated by the rod 38 passing through an axial cavity in the shaft 3. A third toothed wheel 6 is also mounted, fast, on the shaft 3. This shaft further carries two supports of large diameter, in the form of collars, 32 and 33, made fast to each other by means of a long sleeve 31 rotatably mounted on the shaft 3, and forming one piece with the extensions 34 and 35 with which the supports are respectively provided; the two supports are coaxial and their axis is parallel to that of the shaft 3, and is as distant from this as the axis of the shaft 1, so that, the assembly of the two supports 32, 33 being free to turn about 3, the axis of the said supports can be brought to coincide with that of the shaft 1.

In the supports 32, 33 is mounted so that it can revolve a part having the form of a cylindrical drum 2, provided with heads 21 and 22 of annular shape and which embraces the shaft 1 with which it can be brought coaxial, for a given position of the supports. The drum 2 carries as many members 23—24, each formed substantially of two coaxial rings, as there are pairs of arms carried by the shaft 1, each of said members being located between the two arms of one of the said pairs. Each one of these members is made up of an outer ring, 23, fast to the drum 2 and an inner ring 24, coaxial with and free to turn with respect to the former by means of any known means of mounting, such as, for instance, a mounting on ball bearing, which is connected to the former by a so-called one-way motion, or free wheel device; that is to say, that whilst its movement in one direction is free, in the opposite direction it is engaged in such manner that the two rings are in this respect locked solidly together. This coupling is represented in the drawings by way of example (Fig. 2), in a conventional manner, as being constituted by the interposition between the internal surfaces of the rings, the one cylindrical and the other with saw-tooth serrations 27, of cylindrical rollers 26.

Figure 2:
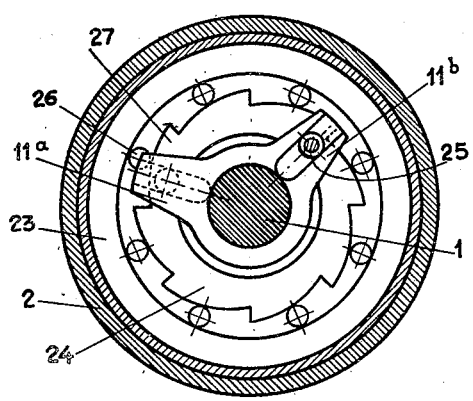
Fig. 2 is a partial cross section, on a larger scale.

Each ring 24 is provided with a revolving pin 25 normal to the plane of the ring and provided at its ends with rollers which can run, with a suitable play, respectively in the two grooves, for example 110, 110a in Fig. 2, of the two arms mounted on the shaft 1 and between which the ring is located. The engagement of these end rollers of the pins 25 in the grooves of the arms 11 constitutes a connection between the shaft 1 and the drum 2; and precisely, when the shaft 1 turns in the direction in which the rotation of the ring 24 is connected with that of the ring 23, the shaft 1 will; in turning, carry the drum 2 around with it.

For the sake of simplicity and clearness in the drawings; in Fig. 1 the connecting members between the shaft 1 and the drum 2 (11, 11a, 23, 24, 25) are not fully shown except for one of the six elements, that is, the first on the left.

When the drum 2 is coaxial with the shaft 1, the system of connection between the two members just described is equivalent to a simple free wheel clutch, inasmuch as the shaft, revolving in the prescribed direction will carry the drum with it, positively. If, on the contrary, the axis of the drum moves away from that of the shaft, which happens when the supports 32, 33, with their connecting sleeve 31, turn about the shaft 3, it is obvious that the rotating speed of the different ring elements 23, 24, being due to the motion they receive from the arms 11 through the pins 25, is at all times different from element to element, and precisely according to the distance at which at any time the different pins 25 are from the axis of rotation of 1. Thus, at all times, one of the inner rings of the aforementioned elements will be revolving at a higher speed than the others; by virtue of the free-wheel connection between the two rings of each element, it will therefore only be that element which is turning the fastest that will be transmitting its motion to the drum, whilst all the other outer rings will be drawn around by the drum 2 at a higher speed than that of the corresponding inner rings, that is to say, there will be a relative rotation between the two rings in the said elements, in the free direction.

When the cylinder 2 is eccentric with the shaft 1, it is therefore driven by the shaft at a speed, higher than that of the shaft itself, and as much higher as the degree of eccentricity is greater. Since each pair of arms 11 takes up in its turn the task of driving the drum, there is, for cinematic reasons which are obvious from the foregoing, at each of these successions (for example: six times in each revolution, in the case illustrated of a mechanism having six elements) a slight pulsation in the speed of the drum; this pulsation, although small, is, however, eliminated by the apparatus, as it will be seen further on.

The drum 2 is provided with a toothed crown 4, by means of which it transmits its motion to the toothed wheel 5 mounted on the secondary shaft 3 and, when the clutch 36 is engaged, to the shaft itself. The meshing of the toothed wheels 4 and 5 remains evidently invariable, whatever may be the position the drum 2 assumes in oscillating about 3. It is thus possible to have on the shaft 3 a speed which, for a constant speed of the driving shaft 1, varies in a continuous manner, according to the eccentricity of the drum 2; nevertheless, owing to constructional necessities, the range of such variations is comprised within rather narrow limits, which would greatly reduce the field of application of the mechanism in practice.

In order to be able to obtain variable speeds over a very wide range, and such as to satisfy any practical requirement whatever, the invention provides for the combination of the changeable speed device just described with a differential device which is described hereafter.

A driven shaft 9 is arranged with its axis on the extension of the driving shaft 1 and suitably supported by the frame 10; on the end of this shaft is keyed a toothed pinion 91, the central plane of which coincides with that of the toothed crown 13 already mentioned. Coaxially with the shaft 9 is mounted, revolving, for example, on ball bearings, a member 8, carrying, rotatably mounted on suitable pins, a certain number of pinions 81 arranged symmetrically around the pinion 91 and in mesh with it and with the toothed crown 13. The assembly of gear wheels 13, 91 and 81 forms a differential gear in which 13 is the active member, 91 the passive member and 81 are the planet pinions; whilst the part 8 is the planet carrier. The latter is fitted with a toothed crown 7 which engages with the toothed wheel 6, already mentioned, keyed on the secondary shaft 3.

The transmission of the motion from the driving shaft to the driven shaft therefore takes place through the differential gearing just described, the active member of which revolves at the speed, supposed constant, of the driving shaft, whilst the train of planet pinions revolves at a speed which varies according to the eccentricity of the drum 2 with respect to the driving shaft. If the transmission ratios of the toothed wheels 4, 5, 6, 7 and 13, 91 are suitably calculated it will be possible to obtain, with a limited variation of the ratio of transmission between the shaft 1 and the drum 2 (as already mentioned) a very wide range of variation of the ratio of transmission between the driving shaft 1 and the driven shaft 9.

The automatic regulation of the ratio of transmission, according to the variation in the resistance couple applied to the driven shaft, so as to maintain constant the power transmitted, is obtained in the following manner.

It must be noted that the force which is transmitted through the pair of toothed wheels 4, 5 creates a certain moment about the axis of the shaft 3; by reaction therefore the drum 2 will be subjected to the said moment, which will tend to make it revolve about the said axis.

Figure 4:
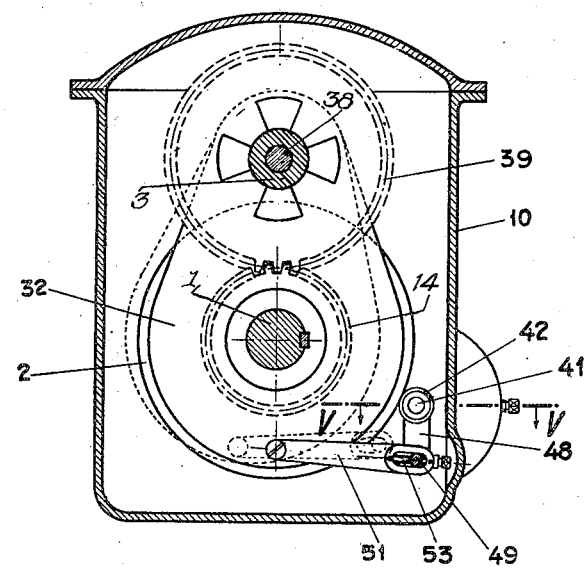
Fig. 4 is a cross section and partial view of the whole mechanism.
Figure 5:
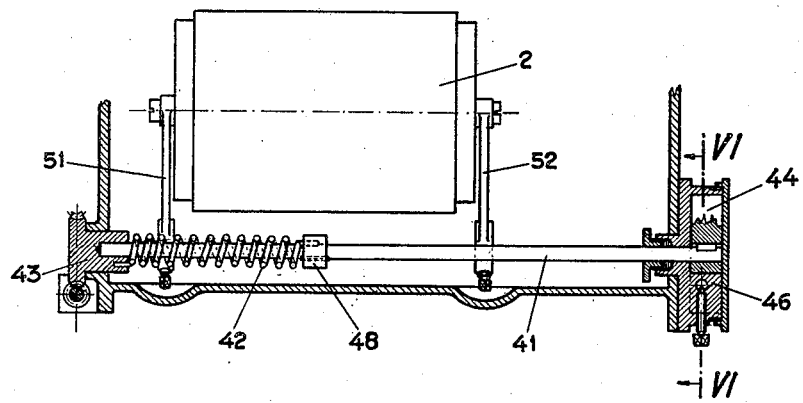
Fig. 5 is a partial horizontal section, on the line V—V of Fig. 4, with a view of other parts of the mechanism.

In order to balance this moment, and maintain the drum 2 in a definite position, in contrast to the reaction which the wheel 5 exerts on wheel 4 and which would tend to draw the drum around in the direction of the former, the drum is anchored (Figs. 4 and 5) by two small connecting rods 51 and 52 forming part of a system of levers on which acts a suitable spring. The connecting rods 51, 52 are in fact pivoted on the ends of a rod 49, parallel to the axis of the drum, mounted, at its central point, on the end of a crank 48 keyed on a shaft 41, parallel to rod 49, and pivoted at its ends on the frame 10. A helical spring 42, one end of which is fixed to the boss of the crank 48 and the other to the part 43, exerts on the system the aforementioned spring action.

Supposing the mechanism to be working under any given speed condition, the force of the spring 42, applied to the drum 2 in the manner just described, will counterbalance the reaction which tends to cause the said drum to rotate. If, for any reason whatever, the couple transmitted tends to increase, the reaction moment will also increase; then the spring 42 will give, giving rise to an increase of its elastic power, and allowing the drum 2 to move a certain distance, which will vary the transmission ratio of the mechanism, and precisely until this ratio reaches that value to which corresponds a reaction moment which will be counterbalanced by the new position of the spring.

It is evident that it is possible to calculate the system of levers and the spring in such a way that the power applied shall not vary with the variation of the resistance couple. Owing, however, to the presence of the differential gear, by virtue of which the power transmitted by the mechanism is subdivided between the toothed wheel 13 (Fig. 1) driven directly by the driving shaft and the planet carrier 8 driven through the speed changing device, by a certain law dependent upon the instantaneous ratio of transmission, calculations show that the moment to be counterbalanced admits of rather small variations.

The arrangement of the connecting rods 51, 52 and of the crank 48, which transmit to the spring the effects of the displacement of the drum 2, has as its aim the suitable multiplication of the said variations; the fact that during the rotation of the crank 48 the angle it forms with the connecting rods varies, and therefore the moment of the effort applied to the connecting rods with respect to the shaft 41 also varies, further allows a certain law of variation to be obtained, conveniently assuming the value of the angle mentioned for an intial position of the mobile system. For the determination of such angle, the effective length of the connecting rods 51, 52 can be adjusted, as it is shown in the figure, by means of the screws 53; this allows of setting the mechanism with absolute exactness.

The initial tension of the spring 42 can, in its turn, be regulated by turning the part 43 in which one of its ends is fixed, and this by means of a suitable worm drive as shown in the figure.

Practically, it is possible, with the described devices to arrange that whilst the maximum variations of the moment tending to turn the drum 2 are, for example, 10%, the corresponding variations of the moment about the shaft 41, which the spring has to counteract, are 30%.

It has been said before that the apparatus according to this invention eliminates those pulsations in speed which necessarily arise from the adoption of the type of continuous speed changing device above described. In fact it is sufficient to observe that for a given power transmitted every variation in speed entails a variation in the couple, in order to be convinced that the self-regulating mechanism will vary the transmission ratio in such a manner that the said couple will not vary, or in other words, that the speed of the driven member remains constant.

The shaft 41 is provided with a device for damping out the oscillations of its rotating movement, with the aim of retarding the said movement and therefore the oscillations in the transmission ratio which would otherwise be due to variations even only momentary in the resistance couple.

Such a case arises, for instance, in the application of the mechanism according to the invention as a change speed gear for automobiles, when, through the effect of a bump, the driving wheels leave the road for an instant. The resistance couple then falls almost completely to zero, to regain almost at once its primitive value. It is advisable that the change speed gear should not act through variations of the resistance couple of such brief duration.

Figure 6:
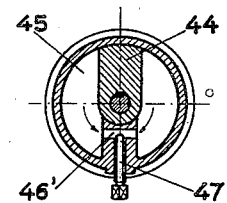
Fig. 6 is a section on the line VI—VI of Fig. 5. Like numerals refer to like parts throughout the several views.

The damping device (Figs. 5 and 6) consists of a segment 44 keyed on one end of the shaft 41 and revolving in a cylindrical casing 45 fixed to the frame. One part of the segment, forming its hub, is hermetically fitted against a fixed partition 46 of the casing, provided with a transverse hole 46', whilst the outer end and sides of the segment are tight against the internal cylindrical surface and against the bases of the casing. In this manner, if the casing is filled with a suitable fluid, for example, glycerine, the rotation of the segment (and therefore also of the shaft 41) cannot take place without the fluid being obliged to pass through the hole 46', a screw 47 allows of obstructing more or less the passage of the fluid, in such a manner as to regulate according to the need, the damping action of the device.

The damping device can be prevented from diminishing that self regulating action of the apparatus which, as mentioned shortly before, serves to eliminate the pulsations of speed due to the fundamental working itself of the apparatus, acting so that the oscillations of the drum 2 of an amplitude below a certain limit shall not be transmitted to the damping device; this may be effected, for instance, by simply introducing in the connecting members between the said mechanisms, a coupling having a certain liberty of movement (play).

The transmission mechanism according to the invention comprises also a reversing device, particularly opportune in its application to automobiles. For this purpose the pair of toothed wheels 14, 39 already mentioned is provided. When, through the operation of the dog clutches 36, 37 the wheel 5 is made to run loose and wheel 39 is made fast to the shaft 3, the change speed gear of which the drum 2 forms part, revolves loose, whilst the motion is transmitted to the driven shaft, at a constant speed ratio, still through the differential device, from one side directly from the driving shaft (through the gear wheel 13) and from the other side also from the driving shaft, but through the gears 14, 39 and 6, 7. Having chosen suitable transmission ratios for these gears, the speed of the planet carrier will be such as to produce the rotation of the driven shaft in a direction contrary to the normal.

The whole mechanism can be conveniently made to work in an oil bath, and for this purpose suitable retaining devices are provided for in the casing forming the frame, where the shafts issue.

It will be appreciated that the best known embodiment of my invention has been illustrated and described in detail, and that my invention contemplates said changes in structural details and features as may occur to persons skilled in the art; accordingly the scope of my invention is not limited to the example thereof disclosed herein but is defined broadly by the appended claims.

I claim:

1. In mechanism for the transmission of rotary motion with a continuously variable transmission ratio, the combination of a driving shaft, a driven shaft, a member rotatable at variable speed about an axis parallel to the axis of rotation of the driving shaft and driven shafts, means for moving said member bodily about an axis parallel to its axis of rotation to displace the same relatively to the driving and driven shafts, arms keyed to the driving shaft and extending radially therefrom and having adjustable driving connections to said variable speed member to transmit the rotary motion of the driving shaft to said member, a drive between said bodily movable member, the driven shaft thereby to drive the driven shaft at a variable speed, and means resisting displacement of the rotary member out of its adjusted position during the transmission of power from the driving shaft to the driven shaft.

2. In a mechanism for the transmission of rotary motion with a continuously variable transmission ratio, the combination of a driving shaft, a driven shaft, a drum surrounding the driving shaft and rotatable at variable speed about an axis parallel to the axis of rotation of the driving shaft and the driven shaft, means for moving said drum bodily about an axis parallel to its axis of rotation to displace the same relatively to the driving and driven shafts, means engaged by the driving shaft and said drum and said driven shaft and said drum to transmit the rotary motion of the driving shaft to the driven shaft thereby to drive the driven shaft at a variable speed, and means resisting displacement of the drum out of its adjusted position during the transmission of power from the driving shaft to the driven shaft.

3. In a mechanism for the transmission of rotary motion with a continuously variable transmission ratio, the combination of a driving shaft, a driven shaft, a drum surrounding the driving shaft and rotatable at variable speed about an axis parallel to the axis of rotation of the driving shaft and driven shaft, means for moving said drum bodily about an axis parallel to its axis of rotation to displace the same relatively to the driving and driven shafts, arms secured to said driving shaft, surrounded by said drum and having driving connections to said drum, said connections being varied as the drum is given said bodily movement, a secondary shaft, means for transmitting power from the driving shaft to said secondary shaft through said drum, to drive said secondary shaft at a speed dependent upon the position of said drum relatively to the driving shaft, and differential gearing intermediate the secondary shaft and the driven shaft, the active gear of which is keyed to the driving shaft and the passive gear to the driven shaft, the intermediate gears of the differential being driven by said secondary shaft.

4. In mechanism for the transmission of rotary motion with a continuously variable transmission ratio, the combination of a driving shaft and a driven shaft, a drum rotatable about an axis parallel to the axis of rotation of the driving shaft and the driven shaft, means for moving said drum bodily about an axis parallel to its axis of rotation to displace the same relatively to the driving and driven shafts, a plurality of guiding members keyed to the driving shaft and extending radially thereof, a plurality of slidable members adapted to slide in said guiding members, a rotary drum surrounding the driving shaft and said guiding members, a mounting for said drum adapting the drum for bodily displacement about an axis parallel to its axis of rotation relatively to the driving shaft and the driven shaft, rings carried by and mounted internally of said drum, said rings carrying said slidable members whereby a driving connection is maintained between the said driving shaft and said rotatable drum, the drum being driven at a speed dependent upon the position of the drum relatively to the driving shaft, a secondary shaft rotatable about an axis parallel to the driving shaft and the driven shaft, and rotated through said drum, and differential gearing intermediate said secondary shaft and the driven shaft, whereby rotary motion is transmitted from the driving shaft to the driven shaft with a variable transmission ratio.

ANTONIO BERIA.